US009164286B2

(12) United States Patent
Odake et al.

(10) Patent No.: US 9,164,286 B2
(45) Date of Patent: Oct. 20, 2015

(54) DISPLAY APPARATUS AND METHOD OF DISPLAYING THREE DIMENSIONAL IMAGE USING THE SAME

(71) Applicant: Samsung Display Co., Ltd., Yongin (KR)

(72) Inventors: Ryota Odake, Hwaseong-si (KR);
Seung-Jun Yu, Suwon-si (KR);
Sang-Min Jeon, Yongin-si (KR);
Jung-Hyun Cho, Suwon-si (KR);
Jin-Hwan Kim, Suwon-si (KR);
Jae-Woo Jung, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 403 days.

(21) Appl. No.: 13/838,040

(22) Filed: Mar. 15, 2013

(65) Prior Publication Data

US 2014/0092329 A1    Apr. 3, 2014

(30) Foreign Application Priority Data

Oct. 2, 2012 (KR) .................. 10-2012-0109709

(51) Int. Cl.
*G02F 1/1335* (2006.01)
*G02B 27/22* (2006.01)
*H04N 13/04* (2006.01)

(52) U.S. Cl.
CPC ........ *G02B 27/2214* (2013.01); *H04N 13/0404* (2013.01); *H04N 13/0475* (2013.01); *H04N 13/0477* (2013.01); *H04N 13/0418* (2013.01)

(58) Field of Classification Search
None
See application file for complete search history.

(56) References Cited

U.S. PATENT DOCUMENTS

| 6,055,013 | A | 4/2000 | Woodgate et al. | |
|---|---|---|---|---|
| 2003/0107686 | A1* | 6/2003 | Sato et al. | 349/15 |
| 2010/0123839 | A1* | 5/2010 | Lu | 349/15 |
| 2011/0090413 | A1* | 4/2011 | Liou | 349/15 |
| 2012/0033145 | A1* | 2/2012 | Ko et al. | 349/13 |
| 2012/0229431 | A1* | 9/2012 | Hiroki | 345/204 |
| 2012/0287037 | A1* | 11/2012 | Shikii et al. | 345/156 |
| 2012/0287359 | A1* | 11/2012 | Yamazaki et al. | 349/15 |
| 2012/0299808 | A1* | 11/2012 | Lee et al. | 345/102 |
| 2013/0057539 | A1* | 3/2013 | Kim | 345/419 |
| 2013/0077024 | A1* | 3/2013 | Shikii et al. | 349/62 |
| 2013/0088653 | A1* | 4/2013 | Lee et al. | 349/15 |
| 2013/0093663 | A1* | 4/2013 | Shikii et al. | 345/156 |
| 2013/0100110 | A1* | 4/2013 | Lee et al. | 345/212 |

FOREIGN PATENT DOCUMENTS

| JP | 07-104212 | 4/1995 |
|---|---|---|
| JP | 2012-058599 | 3/2012 |
| KR | 1020040049310 | 6/2004 |

* cited by examiner

*Primary Examiner* — Timothy L Rude
(74) *Attorney, Agent, or Firm* — H.C. Park & Associates, PLC

(57) ABSTRACT

A display panel displays a first image during a first subframe and a second image during a second subframe. A display panel driver provides the first and second images to the display panel. A light source part provides light to the display panel. A light converting element is disposed between the display panel and the light source part and includes a barrier part and a lens part disposed on the barrier part. The barrier part has a plurality of independently controllable barrier groups. A position detecting part determines a position of a viewer. A barrier driver controls the barrier part to selectively transmit light from the light source part based on the viewer's position. A single barrier group includes a plurality of barriers, and a single barrier includes a plurality of sub-barriers.

26 Claims, 10 Drawing Sheets

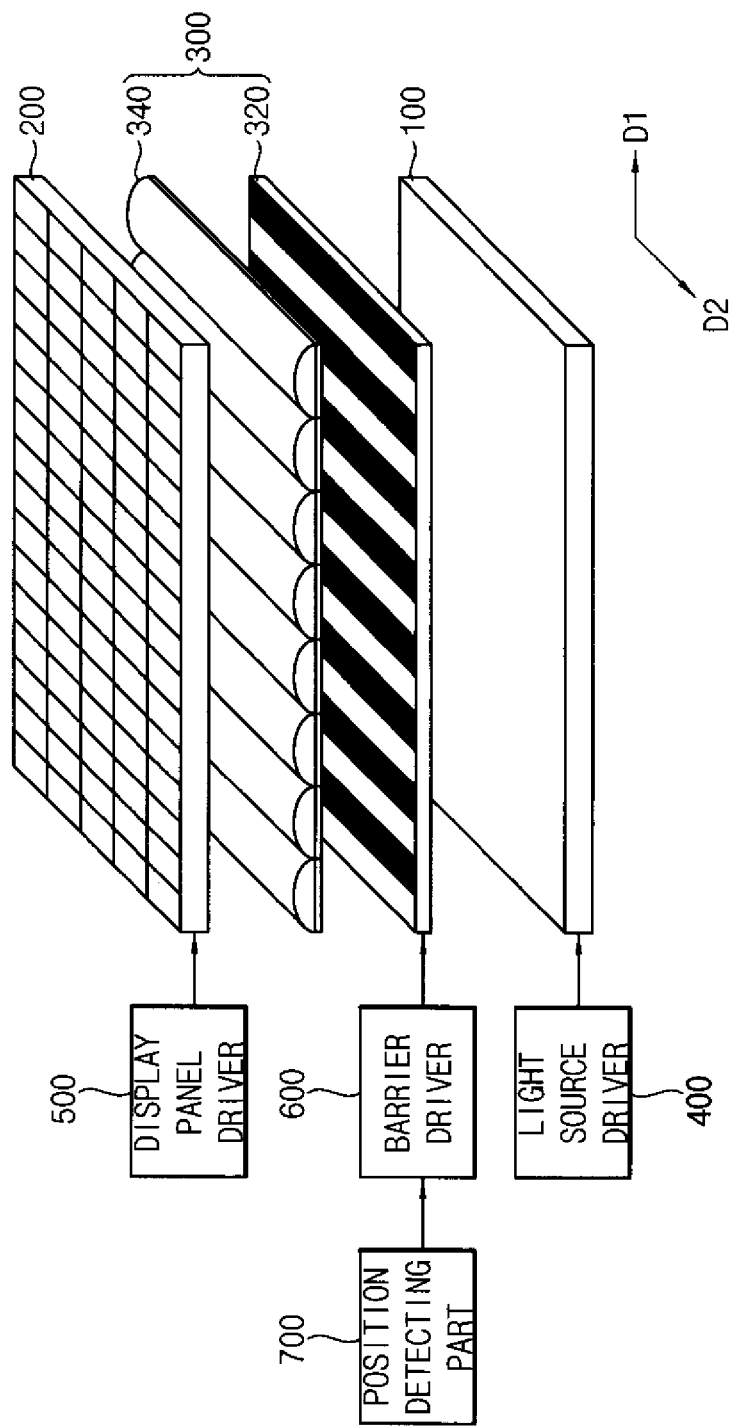

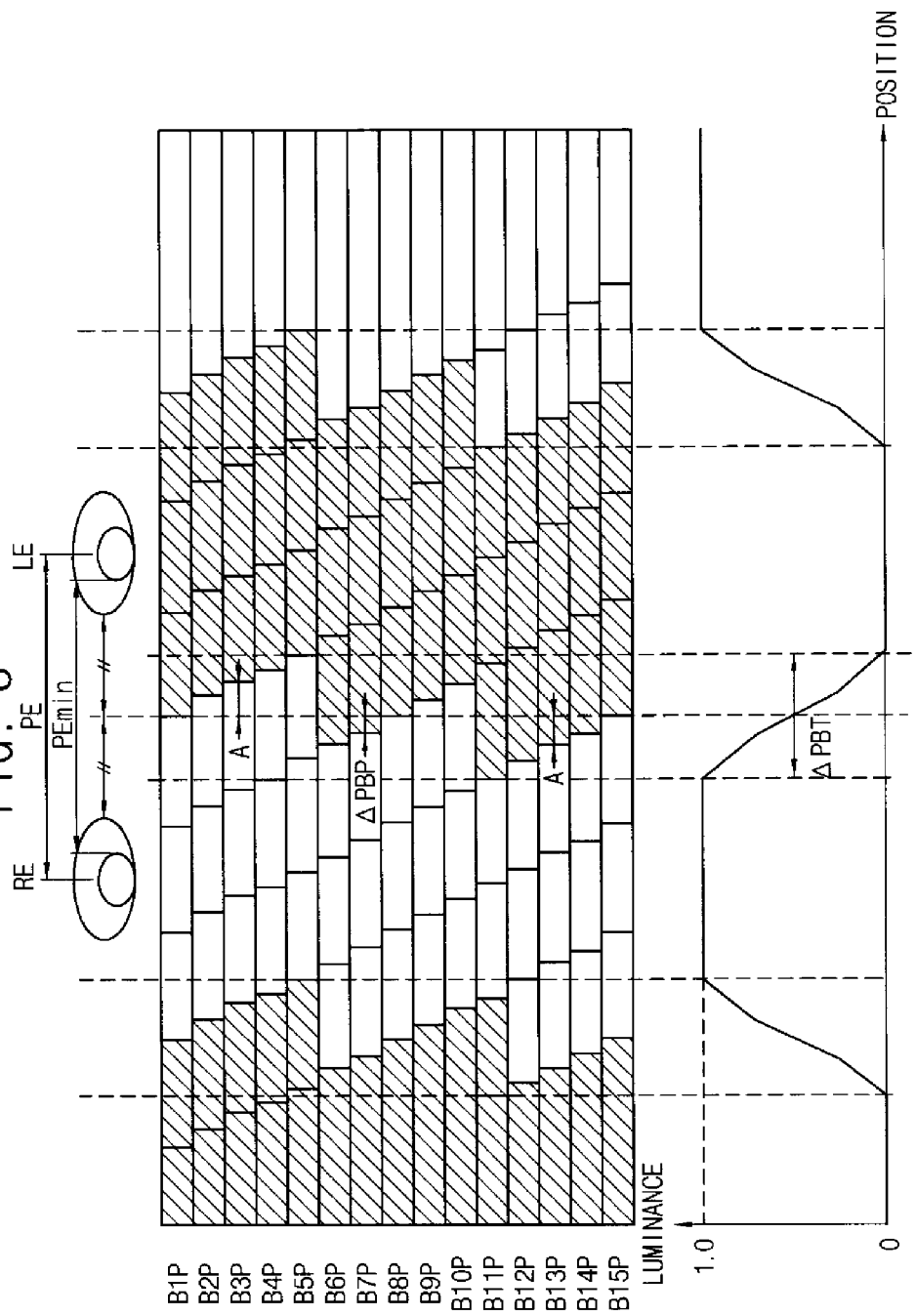

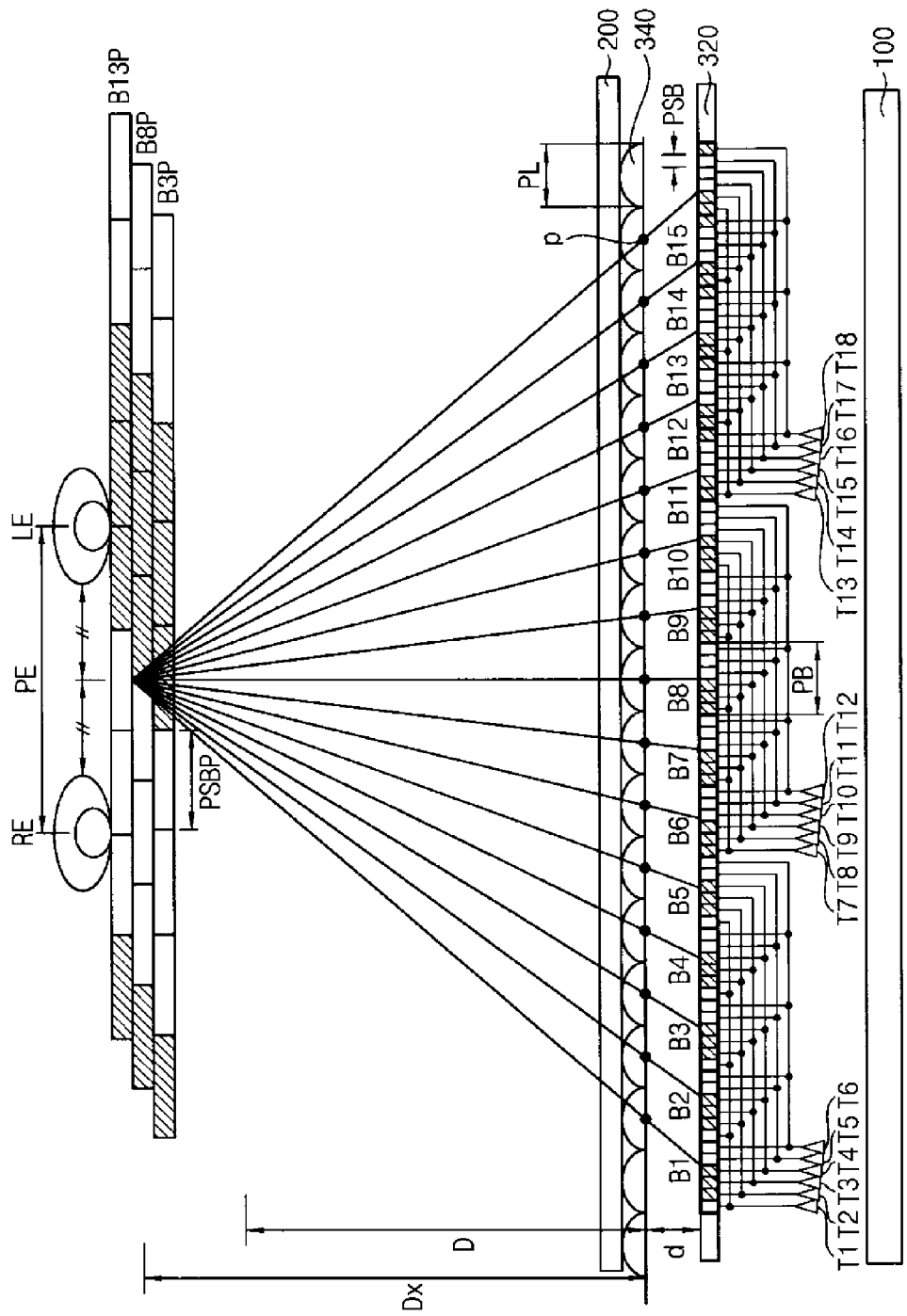

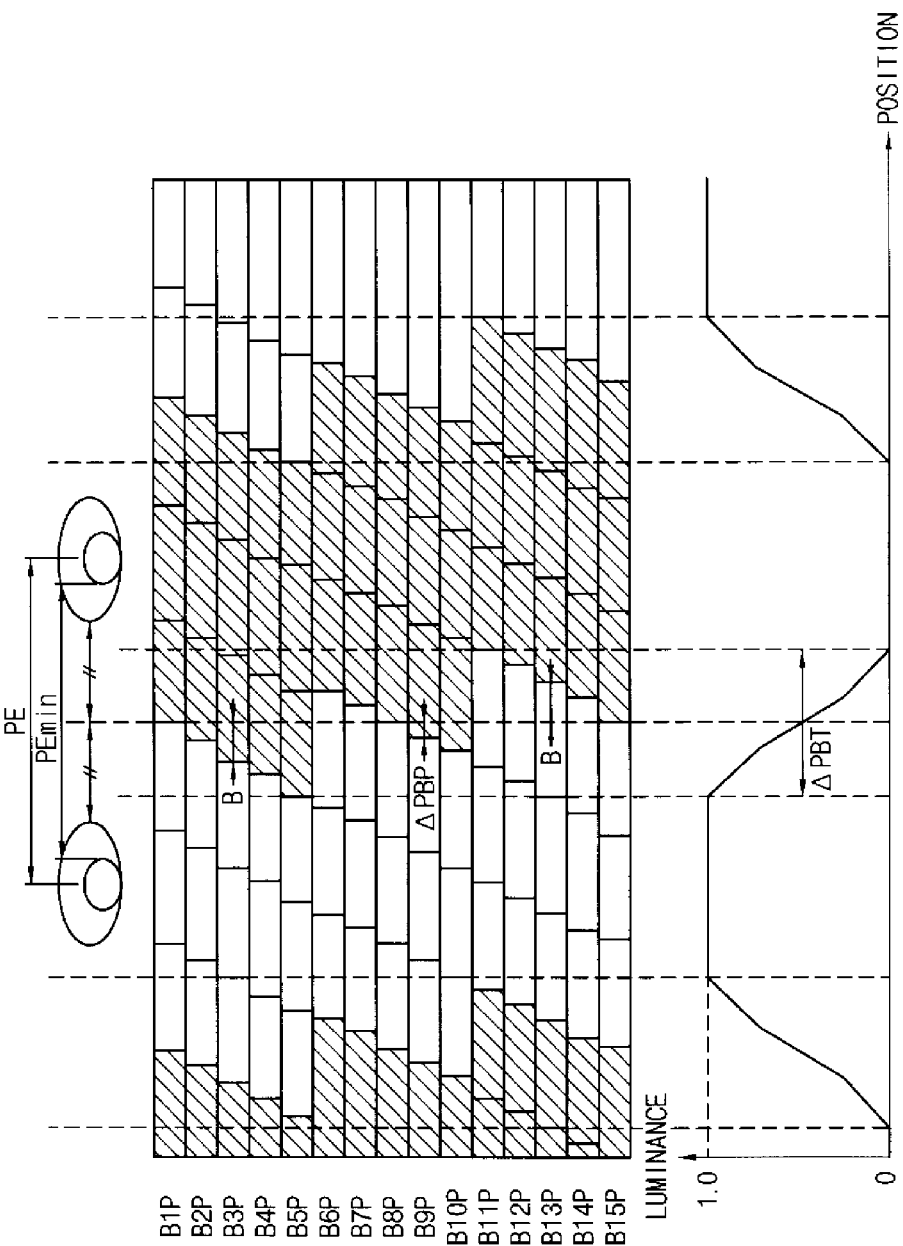

DISPLAY APPARATUS AND METHOD OF DISPLAYING THREE DIMENSIONAL IMAGE USING THE SAME

CROSS-REFERENCE TO RELATED APPLICATION

This application claims priority from and the benefit of Korean Patent Application No. 10-2012-0109709, filed on Oct. 2, 2012, which is hereby incorporated by reference for all purposes as if fully set forth herein.

BACKGROUND

1. Field

Exemplary embodiments of the present invention relate to a display apparatus and a method of displaying a three-dimensional ("3D") image using the display apparatus. More particularly, exemplary embodiments of the present invention relate to a display apparatus capable of improving display quality and a method of displaying a 3D image using the display is apparatus.

2. Discussion of the Background

Generally, a liquid crystal display apparatus displays a two-dimensional ("2D") image. Recently, as demand for displaying a 3D image has increased in video game and movie industries, the liquid crystal display apparatus has been developed to display the 3D image.

Generally, a stereoscopic image display apparatus displays the 3D image using a binocular parallax between two eyes of a human. For example, as two eyes of a human are spaced apart from each other, images viewed at different angles are inputted to a human brain. The human brain mixes the images so that a viewer may recognize the stereoscopic image.

The stereoscopic image display device may be divided into a stereoscopic type and an auto-stereoscopic type, depending on whether a viewer needs glasses to observe the 3D image. The stereoscopic type may include an anaglyph type, a shutter glass type, and so on. In the anaglyph type, the viewer wears blue glasses and red glasses. In the shutter glass type, a left image and a right image may be temporally divided to be periodically displayed, and a viewer wears glasses that open and close a left eye shutter and a right eye shutter in synchronization with the period of the left and right images.

The auto-stereoscopic type may include a lenticular type and a barrier type. The lenticular type uses a lenticular lens having a plurality of focal points. The 2D image is refracted by the lenticular lens at the focal points to display the 3D image. The barrier type uses a plurality of barriers selectively covering a display panel. The barriers selectively block an image on the display panel so that a left image and a right image become different from each other. As a result, the 2D image is converted into the 3D image by the barriers.

When the viewer watching the auto-stereoscopic display apparatus moves, crosstalk, which means that the left image is shown to the right eye of the viewer and the right image is shown to the left eye of the viewer, may be generated.

BRIEF SUMMARY OF THE INVENTION

Exemplary embodiments of the present invention provide a display apparatus that may improve a display quality of a three-dimensional ("3D") image when a viewer moves.

Exemplary embodiments of the present invention also provide a method of displaying the 3D image using the display apparatus.

In an exemplary embodiment of a display apparatus according to the present invention, the display apparatus includes a display panel, a display panel driver, a light source part, a light converting element, a position detecting part and a barrier driver. The display panel is configured to display a first image during a first subframe and a second image during a second subframe. The display panel driver is configured to provide the first image and the second image to the display panel. The light source part is configured to provide light to the display panel. The light converting element is disposed between the display panel and the light source part. The light converting element includes a barrier part and a lens part disposed on the barrier part. The barrier part has a plurality of barrier groups. The barrier groups are is configured to be independently controlled. The position detecting part is configured to detect a position of a viewer. The barrier driver is configured to control the barrier part to selectively transmit the light provided from the light source part based on the position of the viewer. Each barrier group includes a plurality of barriers. Each barrier includes a plurality of sub-barriers.

In an exemplary embodiment of a method of displaying a three-dimensional ("3D") image according to the present invention, the method includes providing a first image to a is display panel during a first subframe and a second image to the display panel during a second subframe, providing a light to the display panel, determining a position of a viewer and controlling a barrier part disposed between the display panel and a light source part to selectively transmit the light provided from the light source part based on the position of the viewer to a lens part disposed on the barrier part. The barrier part has a plurality of barrier groups. The barrier groups are controlled independently. Each barrier group includes a plurality of barriers. Each barrier includes a plurality of sub-barriers.

According to another exemplary embodiment of the present invention, a method of displaying a three-dimensional ("3D") image includes providing a light from a light source to a display panel via a lens. The method also includes providing a first eye image to the display panel for a first period, providing a second eye image to the display panel for a second period, and determining a position of a viewer. In response to a determination that the viewer is positioned at a first distance from the lens, light is provided from the light source to the lens, the light being provided from a first region, a second region, and a third region, and a pattern of the provided light in the first region, the second region, and the third region is the same. In response to a determination that the viewer is positioned at a second distance from the lens, the second distance differing from the first distance, light is provided from the light source to the lens, the light being provided from the first region, the second region, and the third region, and the pattern of the provided light in the first region, the pattern of provided light in the second region, and the pattern of provided light in the third region all differ from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 1 is a perspective view illustrating a display apparatus according to an exemplary embodiment of the present invention.

FIG. 8 is a conceptual diagram illustrating luminance distribution of an image is shown to eyes of the viewer through the barriers of FIG. 7.

FIG. 9 is a conceptual diagram illustrating a state of the barrier part of FIG. 1 when the viewer is disposed at a distance greater than the proper distance.

FIG. 10 is a conceptual diagram illustrating luminance distribution of an image shown to eyes of the viewer through the barriers of FIG. 9.

DETAILED DESCRIPTION OF THE ILLUSTRATED EMBODIMENTS

Figure 2A:
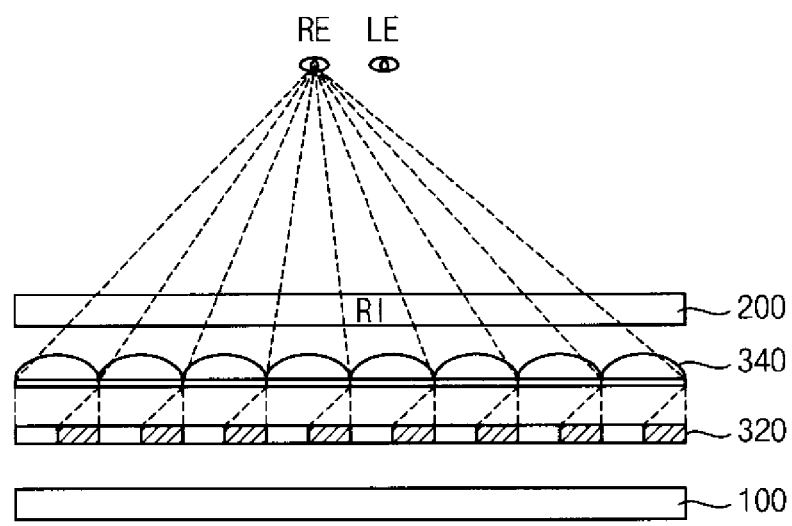
FIG. 2A is a conceptual diagram illustrating images provided to a right eye of a viewer by a display panel and a light converting element of FIG. 1 in a first subframe.

Hereinafter, exemplary embodiments of the present invention will be described in further detail with reference to the accompanying drawings. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a perspective view illustrating a display apparatus according to an exemplary embodiment of the present invention.

Referring to FIG. 1, the display apparatus includes a light source part 100, a display panel 200, a light converting element 300, a light source driver 400, a display panel is driver 500, a barrier driver 600, and a position detecting part 700.

The light source part 100 provides a light to the display panel 200. The light source part 100 includes a light source generating a light. For example, the light source may include a cold cathode fluorescent lamp ("CCFL"), an external electrode fluorescent lamp ("EEFL"), a flat fluorescent lamp ("FFL"), or a light emitting diode ("LED"). The light source part 100 may be a backlight assembly.

In the present exemplary embodiment, the light source part 100 may be continuously turned on when the display apparatus is turned on. Alternatively, the light source part 100 may be driven in a scanning driving method or a blinking driving method.

The light source part 100 may be a direct type light source part, which is disposed under the display panel 200 to provide a light to the display panel 200. Alternatively, the light source part 100 may be an edge type light source part, which is disposed corresponding to an edge of the display panel 200 to provide a light to the display panel 200. When the light source part 100 is the edge type light source part, the light source part 100 may further include a light guide plate (not shown).

The display panel 200 displays an image. The display panel 200 is disposed on the light source part 100. The display panel 200 includes a plurality of pixels. The pixels may be disposed in a matrix pattern. The display panel includes a first panel substrate (not shown), a second panel substrate (not shown) facing the first panel substrate, and a liquid crystal layer (not shown) disposed between the first and second panel substrates.

The display panel 200 has a rectangular shape. For example, the display panel 200 has a longer side in a first direction D1 and a shorter side in a second direction D2 crossing the first direction D1.

The display panel 200 includes a plurality of gate lines, a plurality of data lines crossing the gate lines, and a plurality of unit pixels connected to the gate lines and the data lines.

The gate lines may extend in the first direction and may be disposed in the second direction. The data lines may extend in the second direction D2 and may be disposed in the first direction D1.

The unit pixel may be one of a red pixel, a green pixel, and a blue pixel. Alternatively, the unit pixel may emit various suitable colors. For example, the unit pixel may be one of a white pixel, a yellow pixel, a magenta pixel, and a cyan pixel.

The light converting element 300 is disposed between the light source part 100 and the display panel 200. The light converting element 300 includes a barrier part 320 and a lens part 340. The light converting element 300 adjusts the light from the light source part 100 to convert a 2D image into a 3D image.

A method of converting the 2D image into the 3D image by the light converting element 300 is explained below with reference to FIGS. 2A and 2B.

The barrier part 320 is disposed on the light source part 100. The barrier part 320 includes a plurality of barriers that selectively cover the light source part 100. The barriers selectively transmit light from the light source part 100 to the lens part 340.

The barrier part 320 includes a first barrier substrate, a second barrier substrate facing the first barrier substrate, and a barrier liquid crystal layer disposed between the first and second barrier substrates.

The barrier part 320 includes a plurality of independently driven barrier groups. A single barrier group includes a plurality of barriers, and a single barrier includes a plurality of sub-barriers.

A first electrode may be formed on the first barrier substrate. A second electrode may be formed on the second barrier substrate. According to a voltage applied between the first and second electrodes, the barrier of the barrier part 320 has a transmitting state or a blocking state.

For example, a plurality of the first electrodes may be formed on the first barrier substrate, and the single second electrode may be formed on the second barrier substrate. A single sub-barrier may correspond to a single first electrode.

The barrier has a shape extending in a direction. The barrier may extend in the second direction D2. The barriers of the barrier part 320 may be disposed in a stripe pattern. Alternatively, the barriers may be disposed in other patterns. For example, the barriers of the barrier part 320 may be disposed in a matrix pattern.

The lens part 340 is disposed on the barrier part 320. The lens part 340 transmits light passing through the barrier part 320 to the display panel 200.

The lens part 340 includes a plurality of lenses. The lenses are disposed in the first direction D1 and extend in the second direction D2.

A width of the barrier in the first direction D1 may be substantially a half of a width of the lens in the first direction D1 when a thickness of the lens part 340 is ignored. When the thickness of the lens part 340 is considered, the width of the barrier in the first direction D1 may be slightly greater than a half of the width of the lens in the first direction D1.

The light source driver 400 is connected to the light source part 100. The light source driver 400 generates a light source driving voltage for driving the light source. The light source driver 400 receives a light source control signal and generates the light source driving voltage based on the light source control signal. The light source driver 400 outputs the light is source driving voltage to the light source part 100. The light source driver 400 may include a direct current (DC) to DC converter.

The light source driver 400 may be disposed under the light source part 100. The light source driver 400 may be disposed out of a receiving container (not shown) facing a bottom surface of the receiving container.

The display panel driver 500 is connected to the display panel 200. The display panel driver 500 generates a panel driving signal for driving the display panel 200. The display panel driver 500 may drive the display panel 200 by dividing a single frame into a plurality of subframes.

For example, the display panel driver 500 may divide a single frame into a first subframe and a second subframe. In this case, the display panel driver 500 provides a first image to the display panel 200 during the first subframe and provides a second image to the display panel 200 during the second subframe.

The display panel driver 500 includes a gate driver and a data driver. For example, the gate driver may be disposed at a side portion of the display panel 200, and the data driver may be disposed at an upper portion of the display panel 200.

The gate driver generates gate signals for driving the gate lines of the display panel 200. For example, the gate driver may sequentially output the gate signals to the gate lines.

The gate driver receives a first control signal from a timing controller (not shown) and generates the gate signals for driving the gate lines of the display panel 200 in response to the first control signal.

The gate driver may include a gate printed circuit board ("PCB", not shown) and is a gate driving chip (not shown). The gate driving chip may be disposed on a tape carrier package ("TCP") connecting the gate PCB to the first panel substrate of the display panel 200.

Alternatively, the gate driver may be directly mounted on the display panel 200. The gate driver may be integrated on the display panel 200.

The data driver generates data voltages for driving the data lines of the display panel 200 and outputs the data voltages to the data lines.

The data driver receives a data signal and a second control signal from the timing controller. The data driver converts the data signal into analog data voltages in response to the second control signal.

The data driver may include a data PCB (not shown) and a data driving chip (not shown). The data driving chip may be disposed on a TCP connecting the data PCB to the first panel substrate of the display panel 200.

Alternatively, the data driver may be directly mounted on the display panel 200. The data driver may be integrated on the display panel 200.

The barrier driver 600 is connected to the barrier part 320. The barrier driver 600 generates a barrier driving signal for driving the barrier part 320. The barrier driver 600 drives the barrier part 320 by dividing a single frame into the plurality of subframes.

For example, the barrier driver 600 divides a single frame into the first subframe and the second subframe. The barrier driver 600 controls the barrier part 320 so that a first group of sub-barriers has a transmitting state and a second group of sub-barriers has a blocking state during the first subframe. The barrier driver 600 controls the barrier part 320 so that the second group of sub-barriers has the transmitting state and the first group of sub-barriers has the blocking state during the second subframe.

The barrier driver 600 controls the barrier part 320 to selectively transmit light according to a position of a viewer received from the position detecting part 700.

The position detecting part 700 determines the position of the viewer and outputs the position to the barrier driver 600.

The position detecting part 700 may determine the position of a viewer using various techniques. For example, the position detecting part 700 may determine positions of two eyes of the viewer. In one alternative, the position detecting part 700 may determine a position of one eye of the viewer. In another alternative, the position detecting part 700 may determine a position of a face of the viewer. According to an exemplary embodiment of the present invention, the position detecting part 700 may use any suitable technique to determine a central point between the two eyes of a viewer, as well as determines a distance of the viewer from the apparatus. As a person having ordinary skill in the art understands how to perform these determinations, they are not described in detail here.

For example, the position detecting part 700 may include a camera. The position detecting part 700 may be disposed at a bezel portion of the display panel 200. In other words, the position detecting part 700 may be integrally formed with the display apparatus. Alternatively, the position detecting part 700 may be separate element that is coupled with the barrier driver 600 via, for example, an input jack on the display apparatus, or wirelessly coupled via a wireless communication scheme.

FIG. 2A is a conceptual diagram illustrating images provided to a right eye RE of a viewer by the display panel 200 and the light converting element 300 of FIG. 1 in a first subframe. FIG. 2B is a conceptual diagram illustrating images provided to a left eye LE of the viewer by the display panel 200 and the light converting element 300 of FIG. 1 in a second subframe.

Hereinafter, a method of displaying the 3D image of the display apparatus when the display panel 200 is driven by dividing frames into the first subframe and the second subframe is explained in detail referring to FIGS. 1, 2A and 2B.

Referring to FIG. 2A, the display panel 200 displays the first image RI in the first subframe. The first image RI may represent a right image for the right eye RE of the viewer.

During the first subframe, a first group of the sub-barriers has the transmitting state, and a second group of the sub-barriers has the blocking state.

During the first subframe, light from the light source part 100 has a first path, which is toward the right eye RE of the viewer, by the first group of the sub-barriers having the transmitting state and the lenses of the lens part 340.

Thus, the right eye RE of the viewer views the right image RI based on the light having the first path during the first subframe.

Figure 2B:
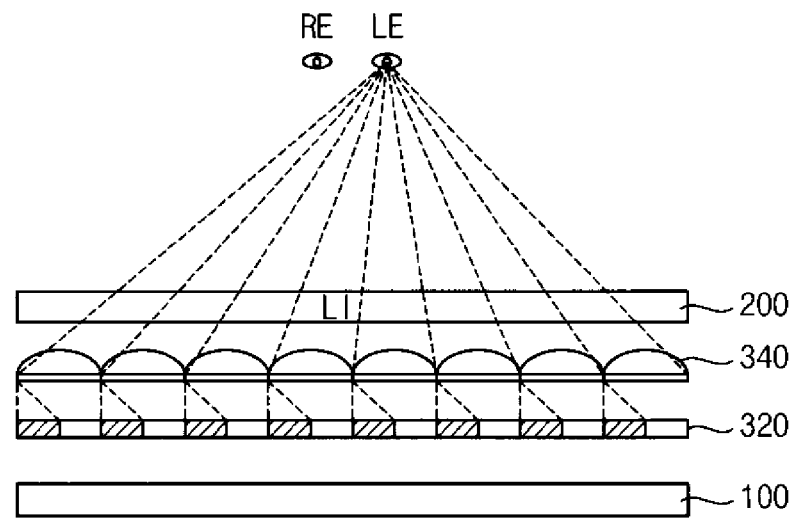
FIG. 2B is a conceptual diagram illustrating images provided to a left eye of the viewer by the display panel and the light converting element of FIG. 1 in a second subframe.

Referring to FIG. 2B, the display panel 200 displays second image LI in the second subframe. The second image LI may represent a left image for the left eye LE of the viewer.

During the second subframe, the first group of the sub-barriers has the blocking state, and the second group of the sub-barriers has the transmitting state.

During the second subframe, light from the light source part 100 has a second path, which is toward the left eye LE of the viewer, by the second group of the sub-barriers having the transmitting state and the lenses of the lens part 340.

Thus, the left eye LE of the viewer views the left image LI based on the light having the second path during the second subframe.

Therefore, the viewer's brain mixes the right image RI inputted from the right eye RE and the left image LI inputted from the left eye LE so that the viewer may recognize the 3D image.

Although the right image RI is displayed in the first subframe and the left image LI is displayed in the second subframe in the present exemplary embodiment, the left image LI may be displayed in the first subframe, and the right image RI may be displayed in the second subframe.

Figure 3:
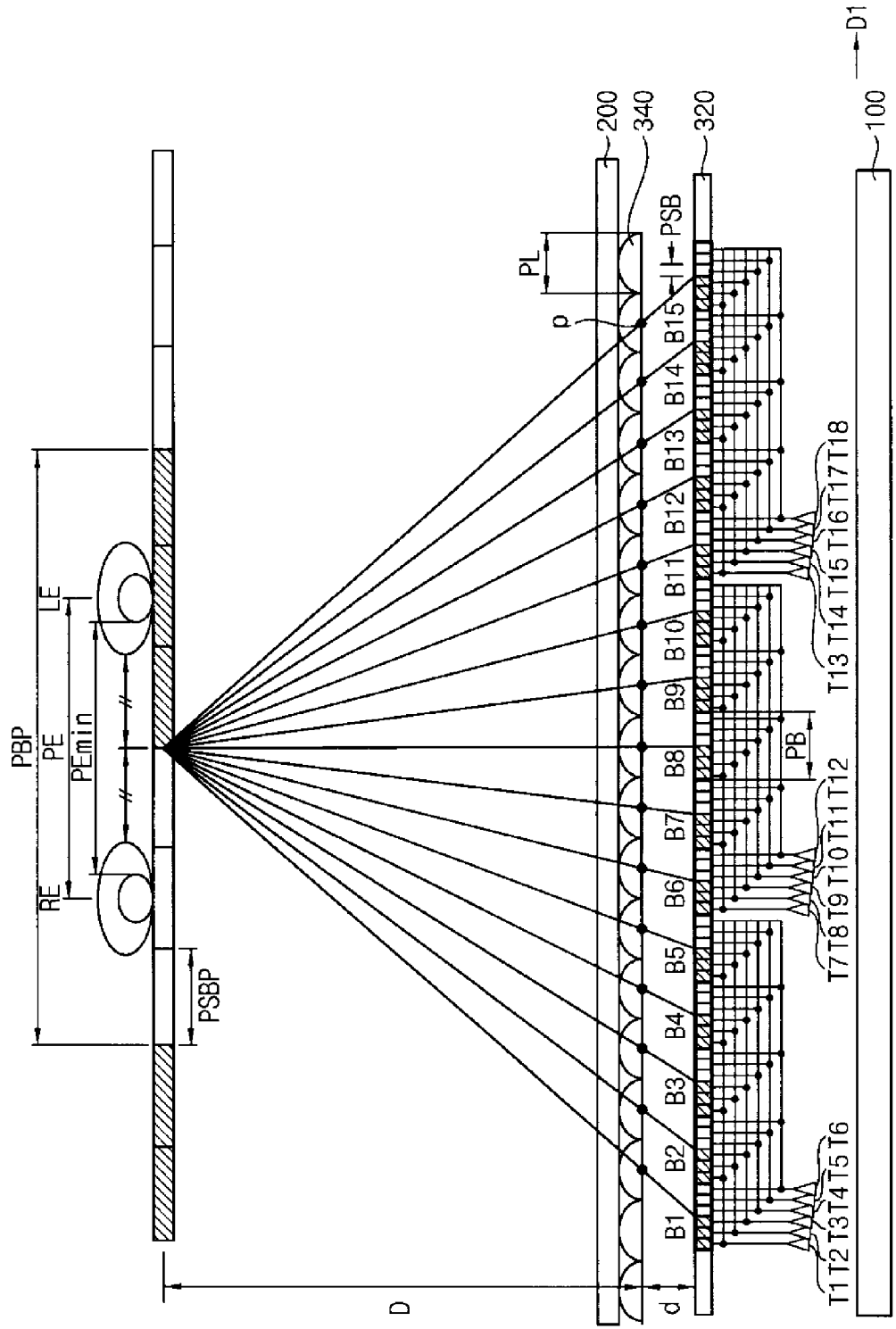
FIG. 3 is a conceptual diagram illustrating a state of a barrier part of FIG. 1 when the viewer is disposed at a proper distance.
Figure 4:
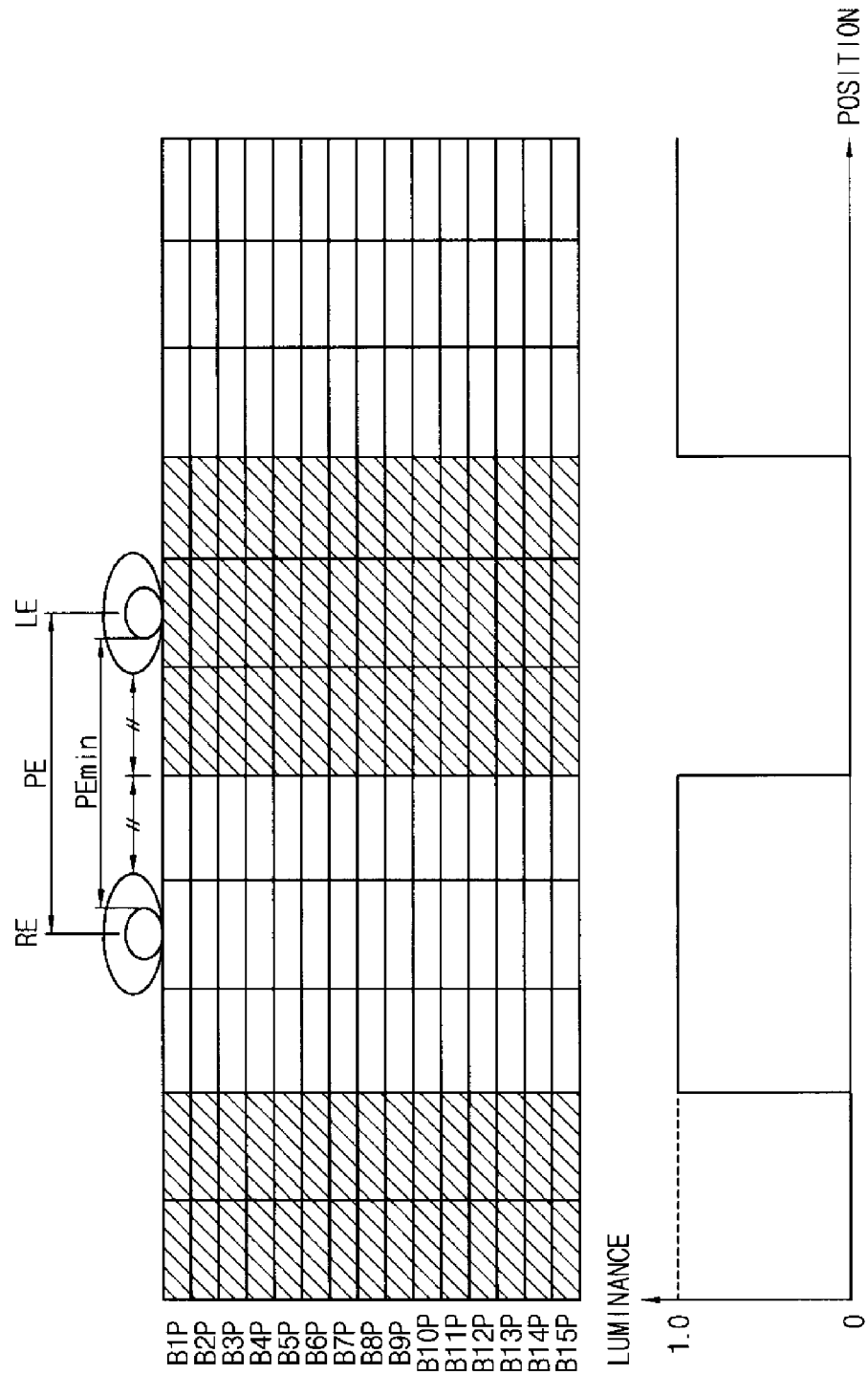
FIG. 4 is a conceptual diagram illustrating luminance distribution of an image shown to eyes of the viewer through barriers of FIG. 3.

FIG. 3 is a conceptual diagram illustrating the state of the barrier part 320 of FIG. 1 when the viewer is disposed at a proper distance. FIG. 4 is a conceptual diagram illustrating luminance distribution of an image shown to the eyes of the viewer through the barriers of FIG. 3.

Referring to FIGS. 1 to 4, the barrier part 320 includes a plurality of barrier groups. A single barrier group includes a plurality of barriers, and a single barrier includes a plurality of sub-barriers.

In the present exemplary embodiment, the barrier part 320 includes first to third barrier groups. The first barrier group includes first to fifth barriers B1, B2, B3, B4 and B5. The second barrier group includes sixth to tenth barriers B6, B7, B8, B9 and B10. The third barrier group includes eleventh to fifteenth barriers B11, B12, B13, B14 and B15.

Each of the barriers B1 to B15 includes six sub-barriers. That is, the first barrier B1 includes first to sixth sub-barriers, the second barrier B2 includes first to sixth sub-barriers, the third barrier B3 includes first to sixth sub-barriers, the fourth barrier B4 includes first to sixth sub-barriers, the fifth barrier B5 includes first to sixth sub-barriers, and so on through the fifteenth barrier B15.

The barriers in the same barrier group are connected to one another. The first to fifth barriers B1 to B5 in the first barrier group are connected to one another. The sixth to tenth barriers B6 to B10 in the second barrier group are connected to one another. The eleventh to fifteenth barriers B11 to B15 in the third barrier group are connected to one another.

For example, first sub-barriers of the first to fifth barriers B1 to B5 in the first barrier group are connected to one another. The first sub-barriers of the first to fifth barriers B1 to B5 are connected to a first terminal T1 so that the same voltage is applied to the first sub-barriers of the first to fifth barriers B1 to B5. Thus, the first sub-barriers of the first to fifth barriers B1 to B5 have the same state, which is one of the transmitting state and the blocking state. Second sub-barriers of the first to fifth barriers B1 to B5 in the first barrier group are connected to one another. The second sub-barriers of the first to fifth barriers B1 to B5 are connected to a second terminal T2 so that the same voltage is applied to the second sub-barriers of the first to fifth barriers B1 to B5. Thus, the second sub-barriers of the first to fifth barriers B1 to B5 have the same state, which is one of the transmitting state and the blocking state. Third sub-barriers of the first to fifth barriers B1 to B5 in the first barrier group are connected to one another. The third sub-barriers of the first to fifth barriers B1 to B5 are connected to a third terminal T3 so that the same voltage is applied to the third sub-barriers of the first to fifth barriers B1 to B5. Thus, the third sub-barriers of the first to fifth barriers B1 to B5 have the same state, which is one of the transmitting state and the blocking state.

The barriers in the different barrier groups are not connected to one another. The barriers B1 to B5 in the first barrier group are not connected to the barriers B6 to B10 in the second barrier group. The barriers B1 to B5 in the first barrier group are not connected to the barriers B11 to B15 in the third barrier group. The barriers B6 to B10 in the second barrier is group are not connected to the barriers B11 to B15 in the third barrier group.

In the present exemplary embodiment, a proper distance of the viewer from the lens is D. When the viewer is disposed at the proper distance D, the viewer may recognize a 3D image well. The proper distance D may be predetermined considering various characteristics of the display panel 100 by a manufacturer. A position of the viewer from the lens is DX (in FIG. 3, DX=D). A principal point of the lens is p. A focal length of the lens is f. A distance between the principal point p of the lens and the barrier part 320 is d. A pitch of the lens is PL. A pitch of the barrier is PB. A pitch of the sub-barrier is PSB. A pitch of a barrier image shown at the position of the viewer through the barriers having the pitch PB of the barrier is PBP. A pitch of a sub-barrier image shown at the position of the viewer through the sub-barriers having the pitch PSB of the sub-barrier is PSBP. A minimum distance between two eyes of the viewer is PEmin.

The proper distance D of the viewer from the lens means a distance at which a width of images concentrated at the respective viewpoints by the light converting element 300 is substantially the same as the distance PE between two eyes of the viewer. At the proper distance D, a light dividing characteristic of the image shown to two eyes of the viewer is relatively good.

In the present exemplary embodiment, the position of the viewer DX from the lens is substantially equal to the proper distance D from the lens.

The barrier driver 600 controls the barrier part 320 based on a central point of positions of the left eye LE of the viewer and the right eye RE of the viewer. The barrier driver 600 determines the transmitting state and the blocking state of the sub-barriers based on central barriers disposed at the central portion in the barrier groups. The central barrier in the first barrier group is the third barrier B3. The central barrier in the second barrier group is the eighth barrier B8. The central barrier in the third barrier group is the thirteenth barrier B13.

The barrier driver 600 determines the transmitting state and the blocking state of the sub-barriers based on boundaries of the sub-barriers that are the closest to a line connecting the principal points p of central lenses, which correspond to the central barriers B3, B8 and B13, and the central point of the positions of two eyes of the viewer. For example, three sub-barriers at a first side from the boundary of the sub-barriers that are the closest to the line have the transmitting state, and three other sub-barriers at a second side from the boundary of the sub-barriers that are the closest to the line have the blocking state.

For example, in the first barrier group, a third sub-barrier and a fourth sub-barrier of the third barrier B3, which is the central barrier, are the closest to a line connecting the principal point p of the central lens, which corresponds to the central barrier B3, and the central point of the positions of two eyes of the viewer. Thus, the barrier driver 600 may determine the transmitting state and the blocking state of the sub-barriers based on the boundaries between the third and fourth sub-barriers of the third barrier B3. For example, during the first subframe, first to third sub-barriers in the third barrier B3 have the blocking state but fourth to sixth sub-barriers in the third barrier B3 have the transmitting state. During the second subframe, the first to third sub-barriers in the third barrier B3 have the transmitting state but fourth to sixth sub-barriers in the third barrier B3 have the blocking state.

The transmitting and blocking states of the remaining sub-barriers in the barrier group are determined to be the same as the states the sub-barriers of the central barrier.

For example, in the first barrier group, the transmitting and blocking states of the sub-barriers of the first, second, fourth and fifth barriers B1, B2, B4 and B5 are determined to be the same as the states the sub-barriers of the central barrier B3.

In the present exemplary embodiment, the viewer is disposed at the proper distance D so that the transmitting and blocking states of the sub-barriers of the barriers B1 to B5 in the first barrier group are the same as the transmitting and blocking states of the sub-barriers of the barriers B6 to B10 in the second barrier group. In addition, the transmitting and blocking states of the sub-barriers of the barriers B1 to B5 in the first barrier group are the same as the transmitting and blocking states of the sub-barriers of the barriers B11 to B15 in the third barrier group.

The distance d of the barrier part 320 from the principal point p of the lens is determined as following Equation 1.

$$d = \frac{1}{\frac{1}{f} - \frac{1}{D}}$$ [Equation 1]

The pitch PB of the barriers of the barrier part 320 is determined as following Equation 2.

$$PB = PL \times \frac{D+d}{D}$$ [Equation 2]

The pitch PSBP of the sub-barrier image shown to the viewer disposed at the position DX which is same as the proper distance D is determined as following Equation 3.

$$PSBP = PSB \times \frac{DX}{d} = PSB \times \frac{D}{d}$$ [Equation 3]

The pitch PSBP of the sub-barrier image is set to be less than the minimum distance PEmin between two eyes of the viewer.

In FIG. 4, a first barrier image shown to the viewer through the first barrier B1 is B1P. A second barrier image shown to the viewer through the second barrier B2 is B2P. A third barrier image shown to the viewer through the third barrier B3 is B3P. The barrier images shown through the fourth through fifteenth barriers B4-B15 are also shown in FIG. 4 (i.e., B4P-B15P).

The viewer is disposed at the proper distance D so that the light dividing characteristic is excellent. Thus, an image corresponding to the left eye LE of the viewer is well blocked and rarely shown to the right eye RE of the viewer. A crosstalk may not be generated so that a display quality may be improved.

Figure 5:
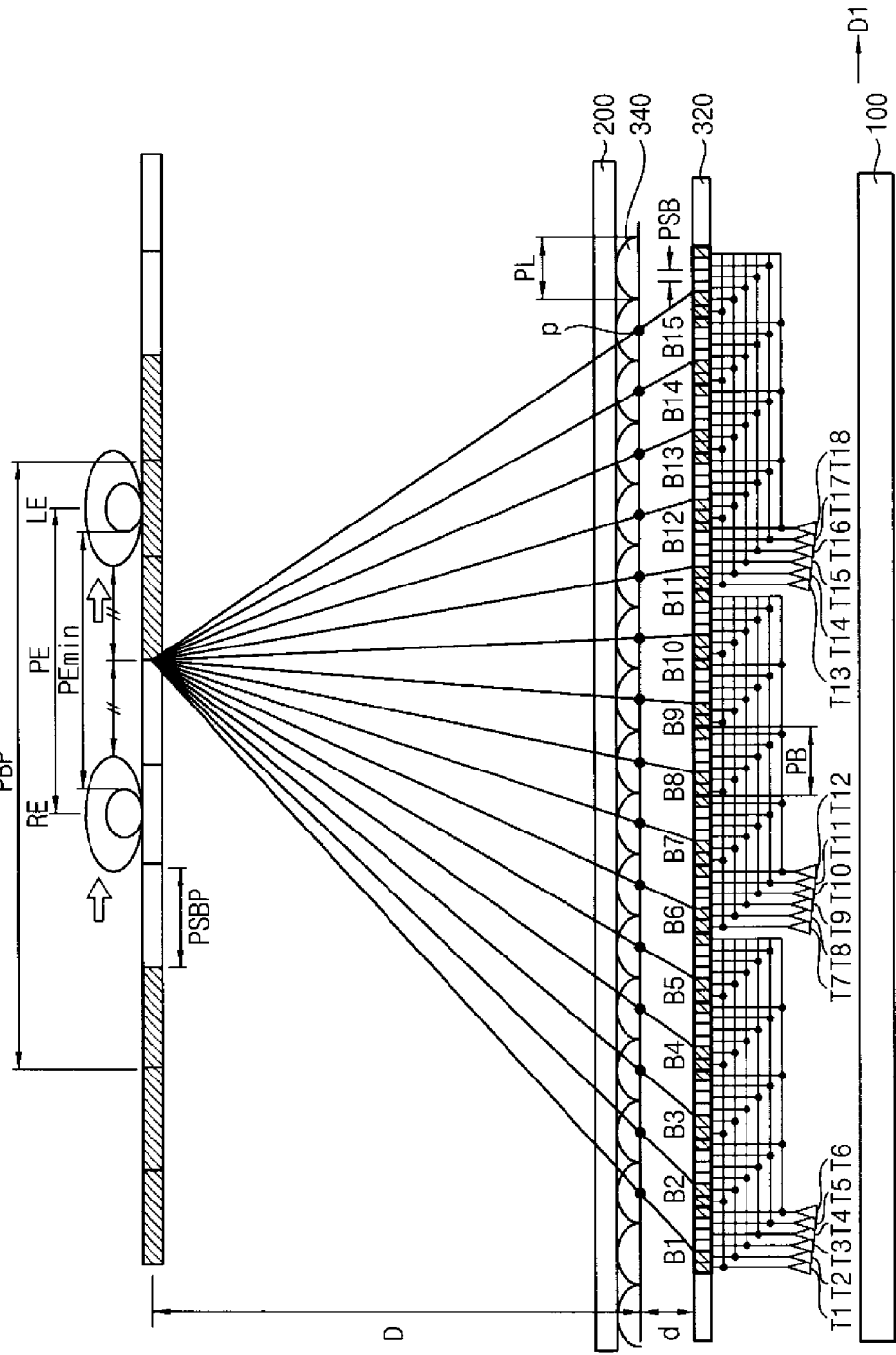
FIG. 5 is a conceptual diagram illustrating a state of the barrier part of FIG. 1 when the viewer moves at the proper distance in a lateral direction.
Figure 6:
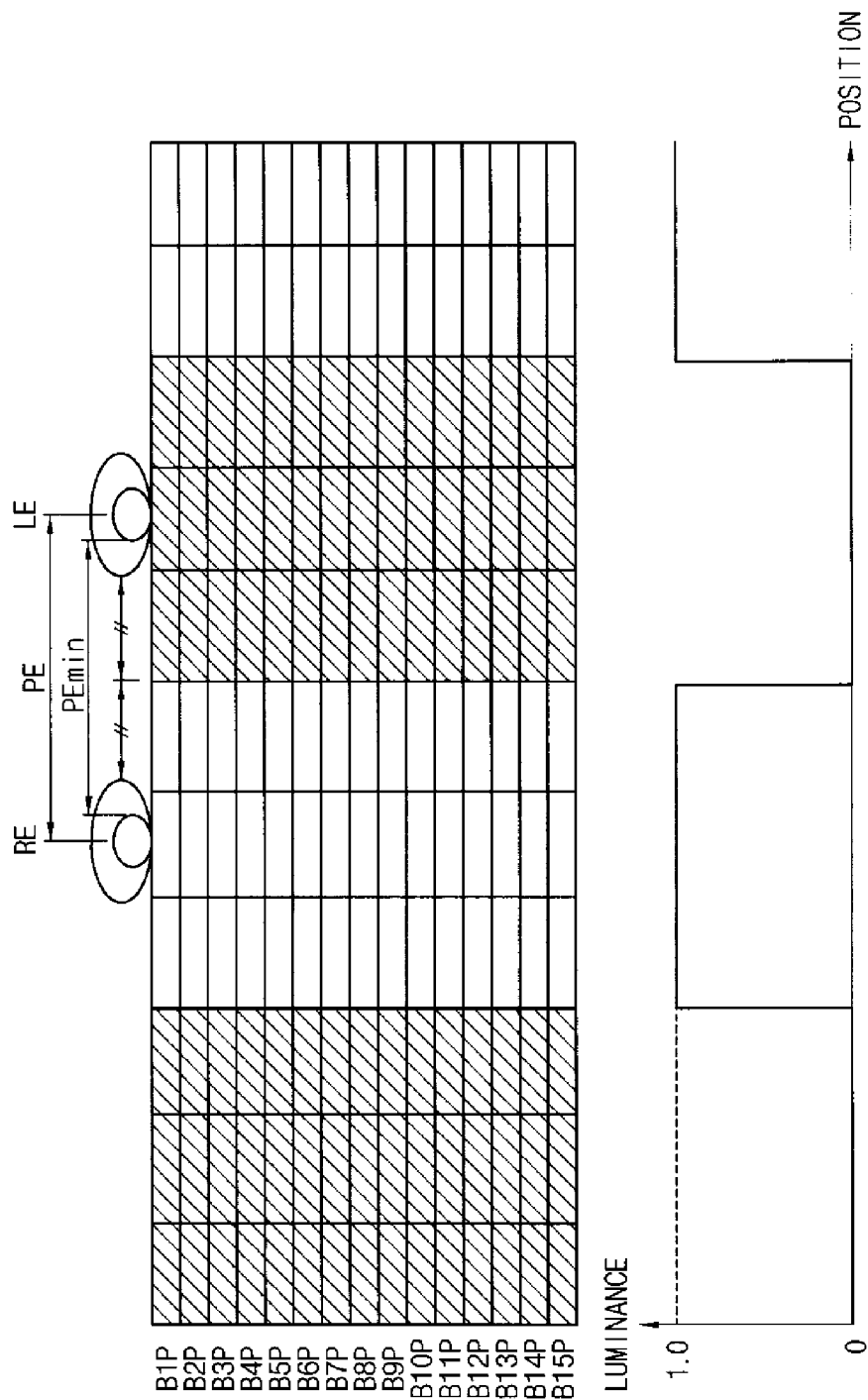
FIG. 6 is a conceptual diagram illustrating luminance distribution of an image shown to eyes of the viewer through the barriers of FIG. 5.

FIG. 5 is a conceptual diagram illustrating a state of the barrier part 320 of FIG. 1 when the viewer moves at the proper distance D in a lateral direction. FIG. 6 is a conceptual diagram illustrating luminance distribution of an image shown to eyes of the viewer through the barriers of FIG. 5.

In FIG. 5, a position of the viewer is moved by the pitch PSBP of the sub pixel image from the position of the viewer in FIG. 3 in the first direction D1.

Referring to FIGS. 5 and 6, the barrier driver 600 controls the barrier part 320 based on the central point of the positions of the left eye LE of the viewer and the right eye RE of the viewer. The barrier driver 600 determines the transmitting state and the blocking state of the sub-barriers based on the central barriers disposed at the central portion in the barrier groups. The central barrier in the first barrier group is the third barrier B3. The central barrier in the second barrier group is the eighth barrier B8. The central barrier in the third barrier group is the thirteenth barrier B13.

The barrier driver 600 determines the transmitting state and the blocking state of is the sub-barriers based on boundaries of the sub-barriers that are the closest to a line connecting the principal points p of central lenses, which correspond to the central barriers B3, B8 and B13, and the central point of the positions of two eyes of the viewer. For example, three sub-barriers at a first side from the boundary of the sub-barriers that are the closest to the line have the transmitting state, and three other sub-barriers at a second side from the boundary of the sub-barriers that are the closest to the line have the blocking state.

For example, in the first barrier group, a second sub-barrier and a third sub-barrier of the third barrier B3, which is the central barrier, are the closest to a line connecting the principal point p of the central lens, which corresponds to the central barrier B3, and the central point of the positions of two eyes of the viewer. Thus, the barrier driver 600 may determine the transmitting state and the blocking state of the sub-barriers based on the boundaries between the second and third sub-barriers of the third barrier B3. For example, during the first subframe, first, second and sixth sub-barriers in the third barrier B3 have the blocking state but third to fifth sub-barriers in the third barrier B3 have the transmitting state. During the second subframe, the first, second and sixth sub-barriers in the third barrier B3 have the transmitting state but third to fifth sub-barriers in the third barrier B3 have the blocking state.

The transmitting and blocking states of the sub-barriers of the other barriers in the barrier group are determined to be the same as the states the sub-barriers of the central barrier.

For example, in the first barrier group, the transmitting and blocking states of the sub-barriers of the first, second, fourth and fifth barriers B1, B2, B4 and B5 are determined to be the same as the states the sub-barriers of the central barrier B3.

In the present exemplary embodiment, the viewer is disposed at the proper distance D so that the transmitting and blocking states of the sub-barriers of the barriers B1 to B5 is in the first barrier group are the same as the transmitting and blocking states of the sub-barriers of the barriers B6 to B10 in the second barrier group. In addition, the transmitting and blocking states of the sub-barriers of the barriers B1 to B5 in the first barrier group are the same as the transmitting and blocking states of the sub-barriers of the barriers B11 to B15 in the third barrier group.

In FIG. 6, a first barrier image shown to the viewer through the first barrier B1 is B1P. A second barrier image shown to the viewer through the second barrier B2 is B2P. A third barrier image shown to the viewer through the third barrier B3 is B3P. The barrier images shown through the fourth through fifteenth barriers B4-B15 are also shown in FIG. 4 (i.e., B4P-B15P).

The viewer is disposed at the proper distance D so that the light dividing characteristic is excellent. Thus, an image corresponding to the left eye LE of the viewer is well blocked and rarely shown to the right eye RE of the viewer. A crosstalk may not be generated so that a display quality may be improved.

Figure 7:
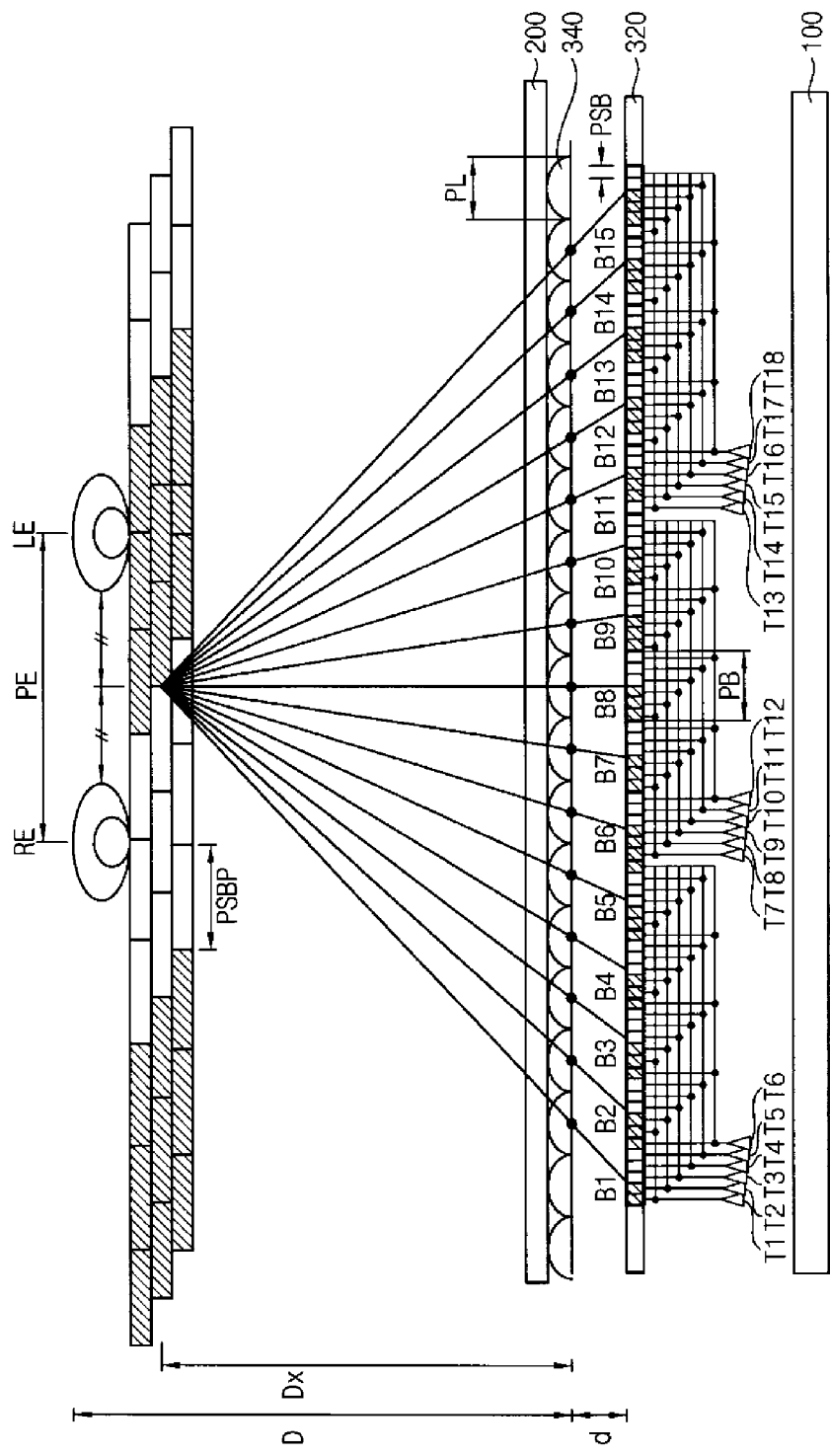
FIG. 7 is a conceptual diagram illustrating a state of the barrier part of FIG. 1 when the viewer is disposed at a distance less than the proper distance.

FIG. 7 is a conceptual diagram illustrating a state of the barrier part 320 of FIG. 1 when the viewer is disposed at a distance DX less than the proper distance D. FIG. 8 is a conceptual diagram illustrating luminance distribution of an image shown to eyes of the viewer through the barriers of FIG. 7.

Referring to FIGS. 7 and 8, in the present exemplary embodiment, a proper distance of the viewer from the lens is D. When the viewer is disposed at the proper distance D, the viewer may recognize a 3D image well. A position of the viewer from the lens is DX. A principal point of the lens is p. A focal length of the lens is f. A distance between the principal point p of the lens and the barrier part 320 is d. A pitch of the lens is PL. A pitch of the barrier is PB. A pitch of the sub-barrier is PSB. A pitch of a barrier image shown at the position of the viewer through the barriers having the pitch PB of the barrier is PBP. A pitch of a sub-barrier image shown at the position of the viewer through the sub-barriers having the pitch PSB of the sub-barrier is PSBP. A minimum distance between two eyes of the viewer is PEmin.

In the present exemplary embodiment, the position of the viewer DX from the lens is less than the proper distance D from the lens.

The barrier driver 600 controls the barrier part 320 based on a central point of positions of the left eye LE of the viewer and the right eye RE of the viewer. The barrier driver 600 determines the transmitting state and the blocking state of the sub-barriers based on central barriers disposed at the central portion in the barrier groups. The central barrier in the first barrier group is the third barrier B3. The central barrier in the second barrier group is the eighth barrier B8. The central barrier in the third barrier group is the thirteenth barrier B13.

The barrier driver 600 determines the transmitting state and the blocking state of the sub-barriers based on boundaries of the sub-barriers that are the closest to a line connecting the principal points p of central lenses, which correspond to the central barriers B3, B8 and B13, and the central point of the positions of two eyes of the viewer. For example, three sub-barriers at a first side from the boundary of the sub-barriers that are the closest to the line have the transmitting state, and three other sub-barriers at a second side from the boundary of the sub-barriers that are the closest to the line have the blocking state.

For example, in the first barrier group, a second sub-barrier and a third sub-barrier of the third barrier B3, which is the central barrier, are the closest to a line connecting the principal point p of the central lens, which corresponds to the central barrier B3, and the central point of the positions of two eyes of the viewer. Thus, the barrier driver 600 may determine the is transmitting state and the blocking state of the sub-barriers of the barriers B1 to B5 in the first barrier group based on the boundaries between the second and third sub-barriers of the barriers B1 to B5. For example, during the first subframe, first, second and sixth sub-barriers in the first to fifth barriers B1 to B5 in the first barrier group have the blocking state but third to fifth sub-barriers in the first to fifth barriers B1 to B5 in the first barrier group have the transmitting state. During the second subframe, the first, second and sixth sub-barriers in the first to fifth barriers B1 to B5 in the first barrier group have the transmitting state but third to fifth sub-barriers in the first to fifth barriers B1 to B5 in the first barrier group have the blocking state.

In the present exemplary embodiment, the viewer is disposed at the position DX different from the proper distance D so that the transmitting and blocking states of the sub-barriers of the barriers B1 to B5 in the first barrier group may be different from the transmitting and blocking states of the sub-barriers of the barriers B6 to B10 in the second barrier group. In addition, the transmitting and blocking states of the sub-barriers of the barriers B1 to B5 in the first barrier group may be different from the transmitting and blocking states of the sub-barriers of the barriers B11 to B15 in the third barrier group.

For example, in the second barrier group, a third sub-barrier and a fourth sub-barrier of the eight barrier B8, which is a central barrier, are the closest to a line connecting the principal point p of the central lens, which corresponds to the central barrier B8, and the central point of the positions of two eyes of the viewer. Thus, the barrier driver 600 may determine the transmitting state and the blocking state of the sub-barriers of the barriers B6 to B10 in the second barrier group based on the boundaries between the third and fourth sub-barriers of the barriers B6 to B10. For example, during the first subframe, first to third sub-barriers in the sixth to tenth barriers B6 to B10 in the second barrier group have the blocking state but fourth to sixth sub-barriers in the sixth to tenth barriers B6 to B10 in the second barrier group have the transmitting state. During the second subframe, the first to third sub-barriers in the sixth to tenth barriers B6 to B10 in the second barrier group have the transmitting state but fourth to sixth sub-barriers in the sixth to tenth barriers B6 to B10 in the second barrier group have the blocking state.

For example, in the third barrier group, a fourth sub-barrier and a fifth sub-barrier of the thirteenth barrier B13, which is a central barrier, are the closest to a line connecting the principal point p of the central lens, which corresponds to the central barrier B13, and the central point of the positions of two eyes of the viewer. Thus, the barrier driver 600 may determine the transmitting state and the blocking state of the sub-barriers of the barriers B11 to B15 in the third barrier group based on the boundaries between the fourth and fifth sub-barriers of the barriers B11 to B15. For example, during the first subframe, second to fourth sub-barriers in the eleventh to fifteenth barriers B11 to B15 in the third barrier group have the blocking state but first, fifth and sixth sub-barriers in the eleventh to fifteenth barriers B11 to B15 in the third barrier group have the transmitting state. During the second subframe, the second to fourth sub-barriers in the eleventh to fifteenth barriers B11 to B15 in the third barrier group have the transmitting state but first, fifth and sixth sub-barriers in the eleventh to fifteenth barriers B11 to B15 in the third barrier group have the blocking state.

When the position DX of the viewer is less than the proper distance D, the lines connecting the principal points p of lenses and the central point of the positions of two eyes of the viewer meet slightly different portions in the barriers. A difference of the pitch PB of the barrier compared to right adjacent barrier is ΔPB. A difference of the pitch PBP of the barrier image compared to the right adjacent barrier image according to the difference ΔPB of the pitch PB of the barrier is ΔPBP.

The difference ΔPB of the pitch PB of the barrier compared to the right adjacent barrier is determined as following Equation 4.

$$\Delta PB = PL \times \left(1 - \frac{d}{D} - \frac{d}{DX}\right) \quad \text{[Equation 4]}$$

The difference ΔPBP of the pitch PBP of the barrier image compared to the right adjacent barrier image is determined as following Equation 5.

$$\Delta PBP = \Delta PB \times \frac{DX}{d} \quad \text{[Equation 5]}$$

In the present exemplary embodiment, as shown in FIG. 8, a difference of the pitch of the third barrier image B3P and the pitch of the eighth barrier image B8P is A, and a difference of the pitch of the eighth barrier image B8P and the pitch of the thirteenth barrier image B13P is A.

When the position DX of the viewer is different from the proper distance D, the maximum range of change of the pitch PBP of the barrier image according to the change of the pitch PB of the barrier is set to be less than the minimum distance PEmin between two eyes of the viewer.

When the maximum range of the change of the pitch PBP of the barrier image is ΔPBT and the number of the barriers in the barrier group is N, the maximum range of the change ΔPBT of the pitch PBP of the barrier image is determined as following Equation 6.

$$\Delta PBT = \frac{1}{2} PSBP + \Delta PBP \times N \quad \text{[Equation 6]}$$

In the present exemplary embodiment, the maximum range of the change ΔPBT of the pitch PBP of the barrier image may correspond to the difference of the pitch of the fifth barrier image B5P and the pitch of the eleventh barrier image B11P.

The maximum range of the change ΔPBT of the pitch PBP of the barrier image is set to be less than the minimum distance PEmin between two eyes of the viewer so that the crosstalk may be prevented. Thus, the display quality may be improved.

FIG. 9 is a conceptual diagram illustrating a state of the barrier part 320 of FIG. 1 when the viewer is disposed at a distance DX greater than the proper distance D. FIG. 10 is a conceptual diagram illustrating luminance distribution of an image shown to eyes of the viewer through the barriers of FIG. 9.

Referring to FIGS. 9 and 10, in the present exemplary embodiment, a proper distance of the viewer from the lens is D. When the viewer is disposed at the proper distance D, the viewer may recognize a 3D image well. A position of the viewer from the lens is DX. A principal point of the lens is p. A focal length of the lens is f. A distance between the principal point p of the lens and the barrier part 320 is d. A pitch of the lens is PL. A pitch of the barrier is PB. A pitch of the sub-barrier is PSB. A pitch of a barrier image shown at the position of the viewer through the barriers having the pitch of the barrier PB is PBP. A pitch of a sub-barrier image shown at the position of the viewer through the sub-barriers having the pitch of the sub-barrier PSB is PSBP. A minimum distance between two eyes of the viewer is PEmin.

In the present exemplary embodiment, the position of the viewer DX from the lens is greater than the proper distance D from the lens.

The barrier driver 600 controls the barrier part 320 based on a central point of is positions of the left eye LE of the viewer and the right eye RE of the viewer. The barrier driver 600 determines the transmitting state and the blocking state of the sub-barriers based on central barriers disposed at the central portion in the barrier groups. The central barrier in the first barrier group is the third barrier B3. The central barrier in the second barrier group is the eighth barrier B8. The central barrier in the third barrier group is the thirteenth barrier B13.

The barrier driver 600 determines the transmitting state and the blocking state of the sub-barriers based on boundaries of the sub-barriers which are the closest to a line connecting the principal points p of central lenses, which correspond to the central barriers B3, B8 and B13, and the central point of the positions of two eyes of the viewer. For example, three sub-barriers at a first side from the boundary of the sub-barriers that are the closest to the line have the transmitting state, and three other sub-barriers at a second side from the boundary of the sub-barriers that are the closest to the line have the blocking state.

For example, in the first barrier group, a fourth sub-barrier and a fifth sub-barrier of the third barrier B3, which is the central barrier, are the closest to a line connecting the principal point p of the central lens, which corresponds to the central barrier B3, and the central point of the positions of two eyes of the viewer. Thus, the barrier driver 600 may determine the transmitting state and the blocking state of the sub-barriers of the barriers B1 to B5 in the first barrier group based on the boundaries between the fourth and fifth sub-barriers of the barriers B1 to B5. For example, during the first subframe, second to fourth sub-barriers in the first to fifth barriers B1 to B5 in the first barrier group have the blocking state but first, fifth and sixth sub-barriers in the first to fifth barriers B1 to B5 in the first barrier group have the transmitting state. During the second subframe, the second to fourth sub-barriers in the first to fifth barriers B1 to B5 in the first barrier group have the transmitting state but first, fifth and sixth sub-barriers in the first to fifth barriers B1 to B5 in the first barrier group have the blocking state.

In the present exemplary embodiment, the viewer is disposed at the position DX different from the proper distance D so that the transmitting and blocking states of the sub-barriers of the barriers B1 to B5 in the first barrier group may be different from the transmitting and blocking states of the sub-barriers of the barriers B6 to B10 in the second barrier group. In addition, the transmitting and blocking states of the sub-barriers of the barriers B1 to B5 in the first barrier group may be different from the transmitting and blocking states of the sub-barriers of the barriers B11 to B15 in the third barrier group.

For example, in the second barrier group, a third sub-barrier and a fourth sub-barrier of the eighth barrier B8, which is a central barrier, are the closest to a line connecting the principal point p of the central lens, which corresponds to the central barrier B8, and the central point of the positions of two eyes of the viewer. Thus, the barrier driver 600 may determine the transmitting state and the blocking state of the sub-barriers of the barriers B6 to B10 in the second barrier group based on the boundaries between the third and fourth sub-barriers of the barriers B6 to B10. For example, during the first subframe, first to third sub-barriers in the sixth to tenth barriers B6 to B10 in the second barrier group have the blocking state but fourth to sixth sub-barriers in the sixth to tenth barriers B6 to B10 in the second barrier group have the transmitting state. During the second subframe, the first to third sub-barriers in the sixth to tenth barriers B6 to B10 in the second barrier group have the transmitting state but fourth to sixth sub-barriers in the sixth to tenth barriers B6 to B10 in the second barrier group have the blocking state.

For example, in the third barrier group, a second sub-barrier and a third sub-barrier of the thirteenth barrier B13, which is a central barrier, are the closest to a line connecting is the principal point p of the central lens, which corresponds to the central barrier B13, and the central point of the positions of two eyes of the viewer. Thus, the barrier driver 600 may determine the transmitting state and the blocking state of the sub-barriers of the barriers B11 to B15 in the third barrier group based on the boundaries between the second and third sub-barriers of the barriers B11 to B15. For example, during the first subframe, first, second and sixth sub-barriers in the eleventh to fifteenth barriers B11 to B15 in the third barrier group have the blocking state but third to fifth sub-barriers in the eleventh to fifteenth barriers B11 to B15 in the third barrier group have the transmitting state. During the second subframe, the first, second and sixth sub-barriers in the eleventh to fifteenth barriers B11 to B15 in the third barrier group have the transmitting state but third to fifth sub-barriers in the eleventh to fifteenth barriers B11 to B15 in the third barrier group have the blocking state.

When the position DX of the viewer is greater than the proper distance D, the lines connecting the principal points p of lenses and the central point of the positions of two eyes of the viewer meet slightly different portions in the barriers. A difference of the pitch PB of the barrier compared to right adjacent barrier is ΔPB. A difference of the pitch PBP of the barrier image compared to the right adjacent barrier image according to the difference ΔPB of the pitch PB of the barrier is ΔPBP.

The difference ΔPB of the pitch PB of the barrier compared to the right adjacent barrier is determined as following Equation 7.

$$\Delta PB = PL \times \left(1 + \frac{d}{D} - \frac{d}{DX}\right) \quad \text{[Equation 7]}$$

The difference ΔPBP of the pitch PBP of the barrier image compared to the right adjacent barrier image is determined as following Equation 8.

$$\Delta PBP = \Delta PB \times \frac{DX}{d} \quad \text{[Equation 8]}$$

In the present exemplary embodiment, as shown in FIG. 10, a difference of the pitch of the third barrier image B3P and the pitch of the eighth barrier image B8P is B, and a difference of the pitch of the eighth barrier image B8P and the pitch of the thirteenth barrier image B13P is B.

When the position DX of the viewer is different from the proper distance D, the maximum range of change of the pitch PBP of the barrier image according to the change of the pitch PB of the barrier is set to be less than the minimum distance PEmin between two eyes of the viewer.

When the maximum range of the change of the pitch PBP of the barrier image is ΔPBT and the number of the barriers in the barrier group is N, the maximum range of the change ΔPBT of the pitch PBP of the barrier image is determined as following Equation 9.

$$\Delta PBT = \frac{1}{2} PSBP + \Delta PBP \times N \quad \text{[Equation 9]}$$

In the present exemplary embodiment, the maximum range of the change ΔPBT of the pitch PBP of the barrier image may correspond to the difference of the pitch of the fifth barrier image B5P and the pitch of the eleventh barrier image B11P.

The maximum range of the change ΔPBT of the pitch PBP of the barrier image is set to be less than the minimum distance PEmin between two eyes of the viewer so that the crosstalk may be prevented. Thus, the display quality may be improved.

According to the exemplary embodiments of the present invention as explained above, the barrier part 320 includes a plurality of barrier groups that are independently driven from each other so that the 3D image may be well displayed and the crosstalk may be prevented despite movement of the viewer. Thus, the display quality of the 3D image may be improved.

Although exemplary embodiments of the present invention described above disclose displaying left and right eye images in subframes, other alternatives are possible. For example, a first frame may display the left eye image and a second frame may display the right eye image. Furthermore, a single frame may be divided into more than two subframes, where each subframe displays either a left or right eye image.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display apparatus, comprising:
    a display panel configured to display a first image during a first subframe and a second image during a second subframe;
    a display panel driver configured to provide the first image and the second image to the display panel;
    a light source part configured to provide a light to the display panel;
    a light converting element disposed between the display panel and the light source part, comprising a barrier part and a lens part disposed on the barrier part, the barrier part comprising a plurality of barrier groups, the barrier groups being configured to be independently controlled;
    a position detecting part configured to detect a position of a viewer; and a barrier driver configured to control the barrier part to selectively transmit the light provided from the light source part based on the position of the viewer, wherein each barrier group of the plurality of barrier groups comprises a plurality of barriers, and is wherein each barrier of the plurality of barriers comprises a plurality of sub-barriers.

2. The display apparatus of claim 1, wherein barriers in the same barrier group are connected to one another.

3. The display apparatus of claim 2, wherein a first sub-barrier of a first barrier in a first barrier group is connected to a first sub-barrier of a second barrier in the first barrier group, and a second sub-barrier of the first barrier in the first barrier group is connected to a second sub-barrier of the second barrier in the first barrier group.

4. The display apparatus of claim 2, wherein barriers in a first barrier group are not connected to barriers in a second barrier group.

5. The display apparatus of claim 1, wherein the barrier driver is further configured to control the barrier part based on a central point of positions of a left eye of the viewer and a right eye of the viewer.

6. The display apparatus of claim 5, wherein the barrier driver is further configured to determine a transmitting state and a blocking state of the sub-barriers based on a central barrier disposed at a central portion in the barrier group.

7. The display apparatus of claim 6, wherein the barrier driver is further configured to determine the transmitting state and the blocking state of the sub-barriers based on a boundary of the sub-barriers that are the closest to a line connecting a principal point of a central lens, which corresponds to the central barrier, and the central point of the positions of the left and right eyes of the viewer.

8. The display apparatus of claim 6, wherein the barrier driver is further configured to control the transmitting state and the blocking state of the sub-barriers of the barriers in the barrier group to be substantially the same as the transmitting state and the blocking state of the sub-barriers of the central barrier in the barrier group.

9. The display apparatus of claim 1, wherein the barrier driver is further configured to control a transmitting state and a blocking state of sub-barriers of barriers in a first barrier group to be substantially the same as a transmitting state and a blocking state of sub-barriers of barriers in a second barrier group in response to a determination that the viewer is disposed at a proper distance from a lens of the lens part.

10. The display apparatus of claim 9, wherein the barrier driver is further configured to control the transmitting state and the blocking state of the sub-barriers of the barriers in the first barrier group to be different from the transmitting state and the blocking state of the sub-barriers of the barriers in the second barrier group in response to a determination that the viewer is disposed at a position different from the proper distance from the lens.

11. The display apparatus of claim 1, wherein if a proper distance of the viewer from a lens of the lens part is D, a position of the viewer from the lens is DX, a principal point of the lens is p, a focal length of the lens is f, a distance between the principal point of the lens and the barrier part is d, a pitch of the lens is PL, a pitch of the barrier is PB, a pitch of the sub-barrier is PSB, a pitch of a barrier image shown at the position of the viewer through the barriers having the pitch PB of the barrier is PBP, a pitch of a sub-barrier image shown at the position of the viewer through the sub-barriers having the pitch PSB of the sub-barrier is PSBP, and a minimum distance between two eyes of the viewer is PEmin, then $$d = \frac{1}{\frac{1}{f} - \frac{1}{D}},$$

$$PB = PL \times \frac{D+d}{D},$$

$$PSBP = PSB \times \frac{DX}{d},$$

and $$PSBP < PE\text{min}.$$

12. The display apparatus of claim 11, wherein the maximum range of change of the pitch PBP of the barrier image according to change of the pitch PB of the barrier is less than the minimum distance PEmin between two eyes of the viewer when the position DX of the viewer from the lens is different from the proper distance D from the lens.

13. The display apparatus of claim 12, wherein if the maximum range of the change of the pitch PBP of the barrier image is ΔPBT, a difference of the pitch PBP of the barrier image compared to a right adjacent barrier image according to a difference of the pitch PB of the barrier is ΔPBP, the number of barriers in the barrier group is N, then $$\Delta PBT = \frac{1}{2} PSBP + \Delta PBP \times N,$$

and $$\Delta PBT < PE\text{min}.$$

14. A method of displaying a three-dimensional ("3D") image, the method comprising:

providing a first image to a display panel during a first subframe and a second image to the display panel during a second subframe;

providing a light to the display panel;

determining a position of a viewer; and controlling a barrier part disposed between the display panel and a light source part to selectively transmit the light provided from the light source part, based on the position of the viewer, to a lens part disposed on the barrier part, the barrier part having a plurality of barrier groups, the barrier groups being independently controllable, wherein a barrier group of the plurality of barrier groups comprises a plurality of barriers, and wherein a barrier of the plurality of barriers comprises a plurality of sub-barriers.

15. The method of claim 14, wherein barriers in the same barrier group are connected to one another.

16. The method of claim 15, wherein a first sub-barrier of a first barrier in a first barrier group is connected to a first sub-barrier of a second barrier in the first barrier group, and wherein a second sub-barrier of the first barrier in the first barrier group is connected to a second sub-barrier of the second barrier in the first barrier group.

17. The method of claim 15, wherein barriers in a first barrier group are not connected to barriers in a second barrier group.

18. The method of claim 14, wherein the barrier part is controlled based on a central point of positions of a left eye of the viewer and a right eye of the viewer.

19. The method of claim 18, wherein controlling the barrier part comprises determining a transmitting state and a blocking state of the sub-barriers based on a central barrier disposed at a central portion in the barrier group.

20. The method of claim 19, wherein the transmitting state and the blocking state of the sub-barriers are determined based on a boundary of the sub-barriers that are the closest to a line connecting a principal point of a central lens, which corresponds to the central barrier, and the central point of the positions of the left and right eyes of the viewer.

21. The method of claim 19, wherein the transmitting state and the blocking state of the sub-barriers of the barriers in the barrier group are substantially the same as the transmitting state and the blocking state of the sub-barriers of the central barrier in the barrier group.

22. The method of claim 14, wherein a transmitting state and a blocking state of sub-barriers of barriers in a first barrier group are substantially the same as a transmitting state and a blocking state of sub-barriers of barriers in a second barrier group in response to determining that the viewer is disposed at a proper distance from a lens of the lens part.

23. The method of claim 22, wherein the transmitting state and the blocking state of the sub-barriers of the barriers in the first barrier group are different from the transmitting state and the blocking state of the sub-barriers of the barriers in the second barrier group in response to determining that the viewer is disposed at a position different from the proper distance from the lens.

24. A method of displaying a three-dimensional ("3D") image by providing a light from a light source to a display panel via a lens, the method comprising:
    providing a first eye image to the display panel for a first period;
    providing a second eye image to the display panel for a second period;
    determining a position of a viewer;
    in response to a determination that the viewer is positioned at a first distance from the lens, providing light from the light source to the lens, the light being provided from a first region, a second region, and a third region, and a pattern of the provided light in the first region, the second region, and the third region is the same; and
    in response to a determination that the viewer is positioned at a second distance from the lens, the second distance differing from the first distance, providing light from the light source to the lens, the light being provided from the first region, the second region, and the third region, and the pattern of the provided light in the first region, the pattern of provided light in the second region, and the pattern of provided light in the third region all differ from each other.

25. The method of claim 24, wherein providing light from the light source to the lens from the first region, the second region, and the third region such that the pattern of the provided light in the first region, the second region, and the third region is the same comprises utilizing a barrier part diposed between the light source and the lens, the barrier part comprising a first barrier group in the first region, a second barrier group in the second region, and a third barrier group in the third region, each barrier group comprising a plurality of barriers, each barrier of the plurality of barriers comprising a plurality of sub-barriers, and corresponding sub-barriers of barriers in the first barrier group, the second barrier group, and the third barrier group all have the same transmitting state during the first period, and the corresponding sub-barriers of the barriers in the first barrier group, the second barrier group, and the third barrier group all have the same blocking state during the second period.

26. The method of claim 25, wherein providing light from the light source to the lens from the first region, the second region, and the third region such that the pattern of the provided light in the first region, the pattern of provided light in the second region, and the pattern of provided light in the third region all differ from each other comprises utilizing the barrier part such that the corresponding sub-barriers of barriers in the first barrier group, the second barrier group, and the third barrier group do not all have the same transmitting state as each other during the first period, and the corresponding sub-barriers of the barriers in the first barrier group, the second barrier group, and the third barrier group do not all have the same blocking state as each other during the second period.

* * * * *